United States Patent [19]

Takakura et al.

[11] Patent Number: 5,299,383
[45] Date of Patent: Apr. 5, 1994

[54] PLANT CULTIVATION METHOD AND APPARATUS THEREFOR

[75] Inventors: Tadashi Takakura; Eiji Goto; Seiji Takishima; Hiromitsu Takada; Einosuke Mifune; Yoshio Takahashi; Fumito Takagi; Yuji Hirosawa, all of Tokyo, Japan

[73] Assignees: Tadashi Takakura; Shimizu Construction Co., Ltd., both of Tokyo, Japan

[21] Appl. No.: 13,533

[22] Filed: Jan. 28, 1993

Related U.S. Application Data

[63] Continuation of Ser. No. 536,117, Jun. 11, 1990, abandoned.

[30] Foreign Application Priority Data

Aug. 2, 1989 [JP] Japan .................................. 1-200801

[51] Int. Cl.⁵ .............................................. A01G 31/00
[52] U.S. Cl. ............................................ 47/58; 47/17; 47/60
[58] Field of Search ................ 47/17 EC, 60 EC, 19, 47/58.11, 58.12; 71/31, 63

[56] References Cited

U.S. PATENT DOCUMENTS

| 1,908,164 | 5/1933 | Minor | 47/58.12 |
| 3,274,730 | 9/1966 | Bose | 47/17 EC |
| 3,320,697 | 5/1967 | Larsen | 47/58.12 |
| 3,348,922 | 10/1967 | Bose et al. | 47/17 |
| 3,492,761 | 2/1970 | Taylor | 47/17 |
| 3,949,522 | 4/1976 | Kehl et al. | 47/17 |
| 4,163,342 | 8/1979 | Fogg et al. | 47/58 |
| 4,255,897 | 3/1981 | Ruthner | 47/17 |
| 4,292,762 | 10/1981 | Fogg et al. | 47/17 |
| 4,567,732 | 2/1986 | Landstrom et al. | 47/17 |

FOREIGN PATENT DOCUMENTS

| 140361 | 5/1985 | European Pat. Off. | |
| 259339 | 8/1988 | Fed. Rep. of Germany | 47/17 EC |
| 282171 | 9/1990 | Fed. Rep. of Germany | 47/17 EC |
| 2621448 | 4/1989 | France | 47/17 EC |
| 1111706 | 9/1984 | U.S.S.R. | 47/17 EC |
| 1143403 | 2/1969 | United Kingdom | 47/17 EC |
| 1349001 | 3/1974 | United Kingdom . | |
| 2037554 | 7/1980 | United Kingdom . | |
| 2133664 | 8/1984 | United Kingdom . | |
| 2184333 | 6/1987 | United Kingdom | 47/17 EC |

OTHER PUBLICATIONS

Botany: Plant Parts and Functions from The Virginia Master Gardener Handbook 459192 Mar. 3, 1975 Russia.

*Primary Examiner*—Henry E. Raduazo
*Attorney, Agent, or Firm*—Oblon, Spivak, McClelland, Maier & Neustadt

[57] ABSTRACT

In a plant cultivation method, in cultivation of a plurality of plants within a cultivation bed which includes nutritive elements required for growth of the plants, a location adjacent a growing point of the plants is selected to supply gas to the growing point. In a plant cultivation apparatus, a cultivation bed is provided on which a plurality of plants are cultivated. The cultivation bed includes nutritive elements required for growth of the plants. An apparatus body for accommodating the cultivation bed has a gas-supply unit for supplying gas toward a location in the vicinity of a growing point of the plants. A gas-conditioning unit is arranged on the apparatus body for conditioning gas therewithin. An illumination unit for emitting a light to the plants.

8 Claims, 2 Drawing Sheets

PLANT CULTIVATION METHOD AND APPARATUS THEREFOR

This application is a continuation of application Ser. No. 07/536,117, filed on Jun. 11, 1990, now abandoned.

BACKGROUND OF THE INVENTION

The present invention relates to a plant cultivation method and an apparatus therefor for artificially cultivating a plurality of plants such as vegetables or the like.

Conventionally, in the case where leaf vegetables and the like, and fruits and vegetables and the like are cultivated in an environment control production equipment such as a green house or an artificial illuminating cultivation chamber, such a cultivating system is general as to keep, to adequate values, various conditions including a light, temperature, humidity, gases and nutrient element, in order to hasten or expedite growth of the vegetables and to produce the vegetables high in quality.

Under such environmental conditions as to accelerate abrupt growth, however, there arise such problems on cultivation as not to be sufficiently covered by the conventional culture technique. As one of the problems, there is a tipburn that is one of physiological disorders. The tipburn is one of calcium deficiency decreases. This symptom is susceptible to appear in lettuce, cabbage, Chinese cabbage, celery and strawberry. There may be a case also in the outdoor cultures that the tipburn is caused if the same conditions are complete or uniform. The vegetables appearing in the tipburn symptoms are considerably reduced in its market price. A mechanism is as follows in which the tipburn is generated in the lettuce.

The reason why the tipburn is caused in the lettuce is rupture of laticifer and collapse or breakdown of cells. However, a direct cause for inducing this tipburn is a reduction in a supply quantity of calcium to growing tissues.

The calcium is deteriorate in movement within the bodies of plants. Accordingly, once the calcium has been accumulated in old leaves, there is less that the calcium is moved to new leaves. Further, in the vicinity of a growing point, there is less in a quantity of transpiration because of insufficient ventilation, so that an absorption ability of nutrient element is reduced. Thus, under such a condition that the total quantity of calcium absorption is less in the entire bodies of plants, deficiency first appears in the vicinity of forward ends of new leaves. Since the tipburn is destruction of leaf tissues, parts in which tipburn is once caused are not again recovered. The tipburn parts stop in growth, and gradually become brown so that the tipburn parts wither and die. From such reason, the tipburn appears primarily on new leaves in the vicinity of the growing point.

In order to solve such problem on cultivation represented by the tipburn, it is essential to improve the cultivating technique. Various approaches have been done to the improvement in the culturing technique from such positions as breeding, utilization of chemical adjusting materials, improvement in culture-solution compositions, and so on. Even if such techniques have been used, however, a method of preventing such tipburn has not still been discovered.

By the way, the culture equipment described above has such an advantage that the culture equipment is not influenced by the outdoor weather conditions so that the optimum environment can be maintained. However, the conventional environmental control technique aims only at hastening or expedition of the growth rate, but is not utilized as means for solving the problems on cultivation.

SUMMARY OF THE INVENTION

It is therefore an object of the invention to provide a plant cultivation method capable of excluding or eliminating physiological disorders without slowing the growth rate of a plurality of plants.

It is another object of the invention to provide a plant cultivation apparatus for carrying the above method into practice.

According to the invention, there is provided a plant cultivation method comprising the step of, in cultivation of a plurality of plants within a cultivation bed which includes nutritive elements required for growth of the plants, selecting a location adjacent a growing point of the plants to supply gas to the growing point.

With the arrangement of the invention, the gas is supplied to the location in the vicinity of the growing point of the plants to be cultivated to make evaporation of water from the plants at parts of the growing point vigorous. Water absorbed through roots of the plants moves to the parts in the form supplementing water shortage or insufficiency. Since the nutritive elements within the cultivation bed have their nature moving within the plants together with the water, a plenty of nutritive elements flow into the parts insufficient for the nutritive elements.

Specifically, the plant cultivation method according to the invention is arranged such that, in cultivation of the plants on the cultivation bed including the nutritive elements required for growth of the plants, the location in the vicinity of the growing point of the plants is selected to supply the gas to the location in the vicinity of the growing point. Thus, transpiration of the water from leaves at the parts in the vicinity of the growing point can be made vigorous. The water is absorbed in the form supplementing the moisture evaporated from the leaves. The nutritive elements within the cultivation bed at this time move into the plants together with the water, whereby it is possible to supply the plenty of nutritive elements to the parts in which the nutritive elements are shortage or insufficient. By the nutritive elements supplied in this manner, it is possible to eliminate or exclude the leaf withering phenomenon and the tipburn which tend to be caused in the plants. Thus, the growth rate is high, and the plants can be produced which have no physiological disorder and which are superior in quality.

According to the invention, there is further provided a plant cultivation apparatus comprising:

a cultivation bed on which a plurality of plants are cultivated, the cultivation bed including nutritive elements required for growth of the plants;

an apparatus body for accommodating the cultivation bed, the apparatus body having gas-supply means for supplying gas toward a location in the vicinity of a growing point of the plants;

gas-conditioning means arranged on the apparatus body for conditioning gas therewithin; and illumination means for emitting a light to the plants.

With the above arrangement of the invention, the gas-conditioning means and the illuminating means are rendered inoperative and operative with respect to the plants which are cultivated on the cultivation bed including the nutritive elements, thereby adjusting the atmosphere around the plants. Further, the location in the vicinity of the growing point is selected to supply the gas by means of the gas-supply means. That is, an illuminating quantity from the illuminating means, a gas-supply quantity from the gas-supply means, and so on are adequately regulated or adjusted to control basic or fundamental environment elements required for photosynthesis reaction and growth of the plants. Thus, there is obtained such a superior functional advantage that a growing speed increases for high-speed production.

DESCRIPTION OF THE EMBODIMENTS

Figure 1:
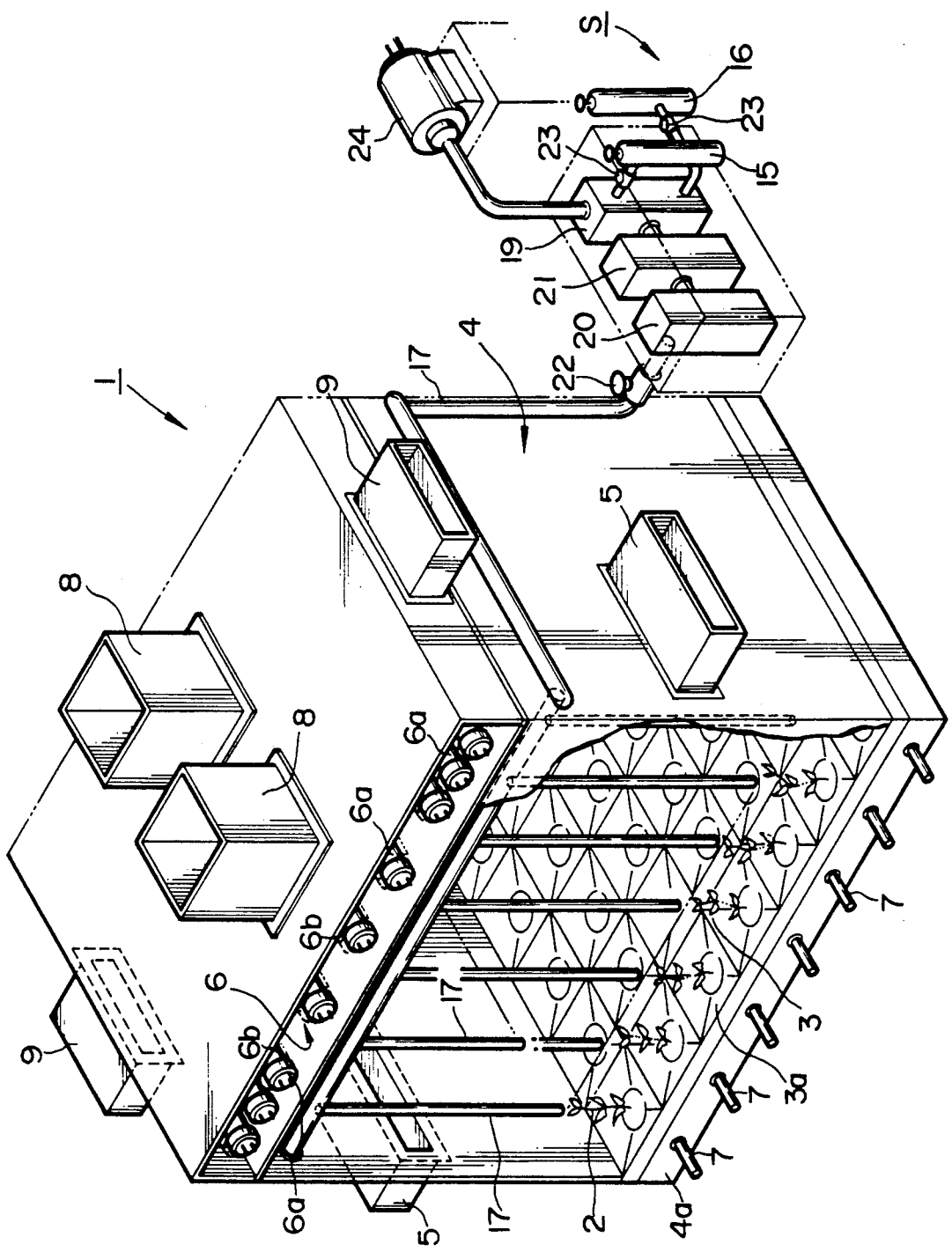
FIG. 1 is a fragmentary perspective view of a plant cultivation apparatus according to an embodiment of the invention.

Referring to FIG. 1, there is shown a plant cultivation apparatus, generally designated by the reference numeral 1, according to an embodiment of the invention. The plant cultivation apparatus 1 comprises an apparatus body 4 having accommodated therein a cultivating bed 3 for cultivating a plurality of plants 2, a pair of ducts 5 and 5 serving as a part of gas- or air-conditioning means for gas- or air-conditioning of the interior of the apparatus body 4, and an illuminating device 6 for emitting a light to the plants 2. The cultivating bed 3 includes nutritive elements required for growth of the plants 2. The apparatus body 4 has a gas or air supplying device S for supplying gas or air toward a location in the vicinity of a growing point of the plants 2.

The interior of the apparatus body 4 forms a culture space including all of other instruments. The environmental conditions of the interior of the apparatus body 4 are controlled by the ducts 5 and the illuminating device 6 as well as the air supplying device S.

The cultivation bed 3 has a plurality of accommodating recesses 3a for fixedly mounting the plants 2 respectively, and is fixedly mounted to a water tank 4a which is formed on the lower surface of the apparatus body 4. Further, a plurality of recirculation pipes 7 are arranged in the cultivation bed 3 for recirculating a culture solution. Moreover, the cultivation bed 3 is provided with a pH measuring unit for measuring concentration of the culture solution supplied to the cultivation bed 3 as well as an electric conductivity measuring unit for measuring electric conductivity (EC) of the culture solution, a liquid fertilizer tank, an acid liquid tank, an alkaline liquid tank and a water supplementary tank for storing therein various fertilizers, a water level sensor for maintaining a water level of the culture solution to an appropriate value, a roller pump, a microcomputer, an A/D converter, and a relay output unit (all not shown).

In addition to the pair of ducts 5 and 5 arranged on the sides of the culture space within the apparatus body 4, the air-conditioning means comprises a cooling dehumidifying unit for cooling and dehumidifying the culture space, a heater for heating the culture space, a humidifying unit for humidifying the culture space, a temperature-humidity measuring unit for measuring temperature and humidity of the culture space, and a temperature-humidity control unit (all not shown) for controlling the cooling dehumidifying unit, the heater and the humidifying unit on the basis of a detecting value measured by the temperature-humidity measuring unit.

The temperature-humidity control unit compares an output signal of the measuring value of the temperature-humidity measuring unit with a setting value inputted beforehand, to determine an amount of operation. On the basis of the amount of operation, the cooling dehumidifying unit, the heater and the humidifying unit are controlled to adjust the temperature and the humidity of the culture space.

The illuminating device 6 comprises a plurality of fluorescent lamps 6a arranged at an upper portion of the apparatus body 4, a plurality of semi-circular reflective plates 6b associated respectively with the fluorescent lamps 6a for reflecting lights emitted respectively therefrom, an electronic ballast, a photometer and a dimmer for adjusting an illuminating degree from the fluorescent lamps 6a, and an ON-OFF timer (all not shown) for adjusting illuminating intervals from the fluorescent lamps 6a. These elements conduct full illumination in the case of a complete artificial cultivation, while the elements conduct supplementary illumination in the case of a culture which effectively utilizes the sun light.

Two pairs of ventilation ducts 8 and 9 are provided respectively on the upper and lateral portions of the apparatus body 4 for ventilating air surrounding the fluorescent lamps 6a which is elevated in temperature due to illumination from the fluorescent lamps 6a.

By the use of the ON-OFF timer, it is possible to freely alter the illuminating time or the light period time and the dark period. Further, the dimmer determines the adjusted quantity of light on the basis of the output from the photometer and the setting value, to adjust the light-emitting quantity from the fluorescent lamps 6a through the stabilizer. By doing so, it is possible to maintain, at optional values, the light intensity and the illuminating time required for the photosynthesis reaction and the growth of the plants 2, without affection or influence of such a phenomenon that the output from the fluorescent lamps 6a decreases with an elapse of time.

Figure 2:
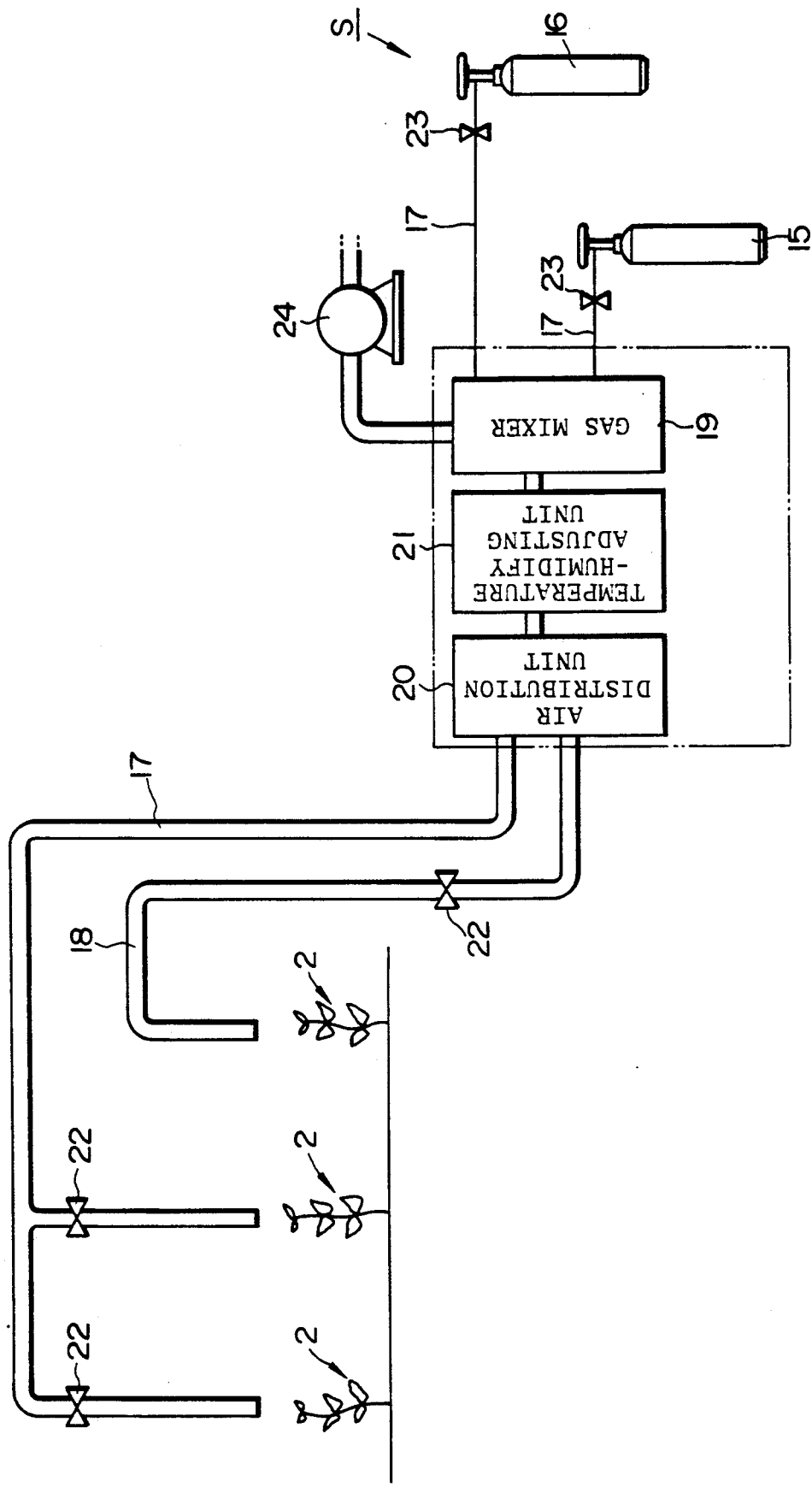
FIG. 2 is a block diagram of the plant cultivation apparatus illustrated in FIG. 1.

The air supplying device S is a device for realizing air-supplying processing or treatment in the vicinity of the growing point of the plants. As shown in FIGS. 1 and 2, the air supplying device S comprises an oxygen bomb 15 having enclosed therein oxygen gas, a carbonic-acid-gas bomb 16 having enclosed therein carbonic acid gas, a plurality of air tubes 17 connected to these two bombs 15 and 16, a flexible tube 18 connected to the air tubes 17, a gas mixer 19 for mixing the oxygen gas and the carbonic acid gas with each other, an air distributor 20 for adjusting flow of these tow gases, a temperature-humidity adjusting unit 21, a plurality of flow adjusting valves 22, a pair of closing valves 23 and an air pump 24.

A using example of the plant cultivation apparatus 1 constructed as above will be described below.

When the plants 2 absorb the culture solution supplied to the cultivation bed 3, the quantity of the culture solution decreases. Further, since the plants 2 have their nature which selects and absorbs ions within the culture solution, an ion composition within the culture solution changes. As a result, the pH value and the electric conductivity are altered. Change in these values is detected by the water level sensor, the pH measuring unit and the electric conductivity measuring unit, and outputs therefrom are inputted to the microcomputer through the A/D converter. A water level, a pH value and an electric conductivity optimum for the respective plants 2 are beforehand inputted to the microcomputer as initial data. These values are compared with the actual measured values to determine amounts of operation. Moreover, the water, addition of fertilizer, adjustment in pH value are mixed with the culture solution through roller pumps respectively from the supplementary water tank, the liquid fertilizer tank, and the acid liquid tank or the alkaline liquid tank. These operations are done such that a signal is sent to the roller pump through the relay output unit to control the liquid delivery time.

The plant cultivation apparatus 1 constructed as above is used to maintain the ion composition and the concentration of the culture solution to their optimum values, so that there are obtained such advantages that the high quality is maintained in the plants that is one of the objects of the plant cultivation method according to the invention, and an adequate culture-solution environment can be created for increasing the quantity of calcium absorption from roots.

Further, supply of the air to the plants 2 can also be done such that the indoor air is delivered by the air pump 24. However, in the cultivating chamber in which precise adjustment in temperature and humidity cannot be done for the entire culture space, the temperature-humidity adjusting unit 21 is used to deliver, to the plants 2, the air in which the temperature and humidity are maintained to adequate values. Moreover, in order to alter the gas concentration and the gas composition, depending upon the kinds or types of the plants and the growing stages, the gas mixer 19 is used to adjust an optional concentration of the oxygen gas and the carbonic acid gas and, subsequently, the air is delivered to the plants 2.

The air supplied to the plants 2 changes its air delivery method in accordance with the size and form of the plants 2 by adjustment of the flow adjusting valves 22 and so on. For instance, in the case where only the flow rate is altered without change in the air delivery direction, the flow adjusting valves 22 are operated to conduct the adjustment. In the case where only the air delivery direction is altered without change in the flow rate, the air tubes 17 and the flexible tube 18 are suitably combined with each other to conduct the change in the air delivery direction.

Experiments conducted to confirm the functional advantages of the plant cultivation method according to the invention, and results of the experiments will be described below.

About thirty-seven (37) days are required for the experiments, and the cultivating process is as follows:

| CULTIVATING PROCESS | | |
|---|---|---|
| DAYS | PROCESS | REMARKS |
| 1 | Seeding | Forty-eight (48) hours in a dark chamber on a seeding tray |
| 3 | Acclimatization | Under weak light within a seedling chamber Substantially coming-out of sprouts evenly |
| 4 | Seeding | Transfer to a bed |
| 21 | Transplanting | Transplanting to cultivation panels |
| 35-37 | Harvest | Harvest at the time of about 90 g |

In the case of light intensity of 260 micro molm$^2$s$^{-1}$(20 klx) and the light period of 14 h.

The experiments were done under the following conditions:

The experiments were done twice, and various air supply methods were compared with each other and were considered.

| | |
|---|---|
| Culture crops: | Butter head lettuce (Mikado Shubyo (K.K.) SL-0) |
| Culture method: | Hydroponic culture pH 5.5–6.5 EC 1.2–1.5 mS/cm |
| Light condition: | 15 klx (seedling stage, white fluorescent lamp) 20 klx (after transplanting, white fluorescent lamp) Length of light period 14 hours Length of dark period 10 hours |
| Temperature and Humidity | 26 degree, 85% (seedling stage) 24 degree, 90% (after transplanting) |
| Concentration of: carbon acid gas | 500 ppm (seedling stage) 1500 ppm (after transplanting) |
| Air-supply: treatment | Blowing of indoor air directly to lettuce from air pump through vinyl tube Air-supply quantity per a plant is flow rate of about 0.5–1.0 l/min, Direction of blowing (direction of tube) is adjusted by clay and wiring mounted to forward end of tube |
| Treatment: division | (1) Portions against which air is blown are two including a location in the vicinity of glowing point (center position and outside leaves (mature leaves) (2) Treatment time is three including light period and dark period (through day), only light period, and only dark period |
| Number of plants: | Eighteen (18) or forty-two (42) plants per one treatment division |

An appraisal or valuation method for the results obtained by the experiments is defined as follows.

In order to investigate whether or not there are functional advantages in prevention of occurrence of a tipburn, there are two methods including a method in which observation is made by the naked eye as to whether or not the tipburn has occurred, and a method in which a content of calcium in leaves is measured. Further, in order to quantify the seriousness of symptoms, comparison is made in number between infected leaves and total leaves.

With regard to the appraisal of quality, comparison can be made by investigation of the number of leaves, the water content and the chlorophyll content.

The results obtained by the experiments and consideration on the basis of the results will be described below.

The results of the experiments are concluded in the below tables 1 and 2.

TABLE 1

DATA OF FIRST EXPERIMENT
(DATA ON HARVEST DAY)

|  | FRESH WEIGHT (g) | WATER CONTENT (%) | CHLOROPHYLL CONTENT (micro g/cm$^2$) |
|---|---|---|---|
| CONTROL | 76.7 | 95.0 | 27.4 |
| AIR-SUPPLY TREATMENT | | | |
| A-1 | 93.3 | 95.9 | 24.8 |
| A-2 | 84.9 | 95.2 | 24.6 |
| A-3 | 83.4 | 95.5 | 24.5 |

|  | PATIO OF TIPBURN OCCURRING PLANTS (%) | 2) RATIO OF OCCURRING LEAF NUMBERS TO TOTAL LEAF NUMBERS (%) |
|---|---|---|
| CONTROL | 98 | 40.8 |
| AIR-SUPPLY TREATMENT | | |
| A-1 | 0 | 0 |
| A-2 | 33 | 16.2 |
| A-3 | 33 | 9.0 |

AIR-SUPPLY TREATMENT
A-1 Air supply to a location in the vicinity of the growing point central portion) during the light period and the dark period.
A-2 Air supply to a location in the vicinity of the growing point (central portion) during the light period.
A-3 Air supply to a location in the vicinity of the growing point (central portion) during the dark period.
1) Plants, in which there is at least one leaf infected by tipburn, are counted as occurring plants, and are expressed by a ratio of the number of the occurring plants to the total or entire number of plants in the treatment.
2) The occurring roots are expressed by a ratio of the number of leaves infected by the tipburn to the total number of leaves.

TABLE 2

DATA ON SECOND EXPERIMENT
(Relationship between days and fresh weight after transplantation and the occurring ratio of the tipburn)
RATIO OF TIPBURN OCCURRING PLANTS (%) 1)

| DAYS | 27th DAY | 29th DAY | 31st DAY | 33rd DAY |
|---|---|---|---|---|
| FRESH WEIGHT | 16 g | 26 g | 37.5 g | 54 g |
| CONTROL | 3 | 56 | 56 | 97 |
| A-1 | 0 | 6 | 6 | 16 |
| A-2 | 6 | 56 | 94 | 94 |

AIR-SUPPLY TREATMENT
A-1 Air supply to a location in the vicinity of the growing point (central portion).
A-2 Air supply to outer leaves (mature leaves).
1) plants, in which there is at least one leaf infected by tipburn, are counted as occurring plants, and are expressed by a ratio of the occurring plants to the total or entire number of plants.

From the table 1, it will be seen that, if air is supplied to a location in the vicinity of the growing point, the restraining effects of the tipburn are extremely high.

In the treatments of A-1, A-2 and A-3, no tipburn was totally observed by the naked eye till the day before harvest. Regarding the ventilation time, ventilation during day was highest in the tipburn restraining effects. It became apparent that, in the air-supply treatments, the number of leaves infected tipburn was extremely small as compared with the control even if the plants were observed in tipburn, and the infected leaves were light in symptoms. Comparing between the air-supply treatments and the control, no considerable difference appeared in measuring values regarding the growth rate and the quality and forms. That is, it became apparent that, regarding the growth rate and the forms, there were obtained high-speed growth and a high quality which were expected.

From the table 2, it was confirmed that no effects were found if air was blown to the outer leaves and, accordingly, there were such functional advantages that, on that particular case where transpiration at a location adjacent the growing point was made vigorous, the calcium on the parts increased so that occurrence of the tipburn was prevented.

By the system described above, a quantity of transpiration increased on the calcium lacking parts of the plants that became the center of the cultivation method according to the invention, a stream of transpiration increased to make it possible to increase the quantity of calcium movement, and it was possible to prevent occurrence of the tipburn.

As described above, according to the plant cultivation method and the plant cultivation apparatus of the embodiment of the invention, the following superior functional advantages are obtained.

First, air is blown to parts which tend to lack in calcium to make transpiration from leaves at the parts vigorous. As a result, the moisture absorbed through the roots moves to the parts in the form supplementing the water shortage or insufficiency. Since the calcium within the culture solution has such a nature as to move within the plants together with water, a plenty of calcium flows into the lacking parts, so that it is possible to prevent the tipburn. As a result, it is possible to produce the plants which have no physiological disorder and which is high in quality and which is high in commercial validity.

Further, the illumination quantity from the illuminating device 6, the air-supply quantity from the air-supplying device S and so on are adequately adjusted whereby fundamental or basic environment factors or elements required for the photosynthesis reaction and growth of the plants are controlled so that it can be expected to have growth rate increasing effects for high-speed production.

In connection with the above, the plant cultivation apparatus according to the invention should not be limited to the above specific embodiment. Other embodiments and modifications can be made to the invention. For instance, the arrangement may be such that a carbonic-acid-gas supplying device is provided for maintaining a concentration of the carbonic acid gas within the apparatus body 4 at a high level. The carbonic-acid-gas supplying device comprises a carbonic-acid-gas bomb having enclosed therein carbonic acid gas, piping connected to the carbonic-acid-gas bomb, a pressure regulator for adjusting a releasing quantity of the carbonic acid gas, an electromagnetic openable valve and a carbonic-acid-gas controller. A releasing quantity of a densitometer incorporated in the carbonic-acid-gas controller is compared with a setting value to determine an operational quantity or a period of time within which the valve is open. The gas within the bomb, which is reduced in pressure to two to three (2-3) atmospheres through the pressure regulator, is sent to the culture space by opening operation of the electromagnetic openable valve. By doing so, it is possible to maintain the carbonic acid gas required for photosynthesis of the plants at the high concentration to hasten or expedite the growth rate.

What is claimed is:

1. A plant cultivation method comprising the steps of, in cultivation of a plurality of plants within a cultivation bed which includes nutritive elements required for the growth of the plants, selecting a location of a terminal bud of each plant, and blowing gas individually against the terminal bud of each of the plants directly above each plant through an air tube which is provided immediately above each of the plants.

2. A plant cultivation method according to claim 1, wherein said nutritive elements comprise calcium.

3. A plant cultivation method according to claim 1, wherein the method further comprises the steps of:
supplying a culture solution to said cultivation bed for recirculating the culture solution,
measuring the amount of the culture solution and the concentration of said nutritive elements in the culture solution, and
making up for the shortage of water or of the nutritive elements in the culture solution on the basis of the measurements.

4. A plant cultivation method according to claim 3, wherein the measurements of the amounts of the culture solution and the concentration of said nutritive elements in the culture solution are achieved by measuring the water level, the pH value, and the electric conductivity of the culture solution.

5. A plant cultivation method according to claim 1, wherein blowing gas against the terminal bud of each of the plants is achieved by sending indoor air using an air pump.

6. A plant cultivation method according to claim 1, wherein said gas blown against the terminal bud of each of the plants is achieved by supplying a mixture of oxygen and carbonic acid gas suitable for the growth of plants, of which the temperature and humidity is suitable for the growth of plants.

7. A plant cultivation method according to claim 1, wherein the flow rate of said gas blown against the terminal bud of each of the plants is adjusted according to the size and form of the plants.

8. A plant cultivation method according to claim 1, wherein the delivery direction of said gas blown against the terminal bud of each of the plants is adjusted according to the size and form of the plants.

* * * * *